(12) United States Patent
Kato et al.

(10) Patent No.: US 7,177,722 B2
(45) Date of Patent: Feb. 13, 2007

(54) ASSEMBLING METHOD AND APPARATUS

(75) Inventors: Tetsuaki Kato, Hadano (JP); Takashi Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 663 days.

(21) Appl. No.: 10/717,489

(22) Filed: Nov. 21, 2003

(65) Prior Publication Data

US 2004/0102862 A1 May 27, 2004

(30) Foreign Application Priority Data

Nov. 21, 2002 (JP) ............................. 2002-338022

(51) Int. Cl.
  G05B 15/00 (2006.01)
  G05B 19/00 (2006.01)
(52) U.S. Cl. ...................... 700/262; 700/247; 700/248; 700/251; 700/257; 700/258; 700/259; 700/260; 700/261; 700/245; 700/264; 318/568.11; 318/568.12; 318/568.13; 318/568.16; 318/568.21; 318/568.25; 606/1; 606/102; 606/130; 606/139; 600/117; 600/118; 600/407; 600/426; 600/429; 600/587; 600/595; 901/1; 901/2; 901/27
(58) Field of Classification Search ................. 700/262
See application file for complete search history.

(56) References Cited

U.S. PATENT DOCUMENTS 3,583,752 A   6/1971 Panissidi
3,984,006 A   10/1976 Takeyasu et al.

4,707,907 A   11/1987 Ivanov (Continued)

FOREIGN PATENT DOCUMENTS

JP          07-314262          12/1995

(Continued)

OTHER PUBLICATIONS

Viale et al., A practical path and motion planner for a tractor-trailer robot, 1997, IEEE, p. 989-996.*

(Continued)

*Primary Examiner*—Thomas Black
*Assistant Examiner*—McDieunel Marc
(74) *Attorney, Agent, or Firm*—Staas & Halsey LLP (57) ABSTRACT

An assembling method and an apparatus for carrying out the method capable of efficiently, reliably and easily detecting an insertion and fitting position, for easy automatic assembly. In case a rod-like workpiece is inserted into a hole in an object, an insertable range is determined based an amount of clearance between the workpiece and the hole, an amount of chamfering of the hole, etc. The insertable range is defined as within a range centered at a hole center position 3cp and having a radium of r. A workpiece center position is indicated by 1cp. While the workpiece is moved once throughout a search range (XL-XU) in the X-axis direction, it is moved in the Y-axis direction by an amount equal to or less than an insertable range amount 2r. As shown by a dotted line, the workpiece center 1cp passes without fail through the insertable range during the motion throughout the search range (XL-XU, YL-YU). When the workpiece center 1cp falls within the insertable range, the workpiece that is pressed toward the object is inserted into the hole.

16 Claims, 7 Drawing Sheets

U.S. PATENT DOCUMENTS

| | | | |
|---|---|---|---|
| 5,718,043 A | | 2/1998 | Pearson |
| 5,925,268 A | * | 7/1999 | Britnell ................. 219/121.63 |
| 5,961,858 A | * | 10/1999 | Britnell ................. 219/121.63 |
| 6,452,131 B2 | * | 9/2002 | Britnell ................... 219/121.6 |
| 2005/0065653 A1 | * | 3/2005 | Ban et al. ................... 700/245 |

FOREIGN PATENT DOCUMENTS

| | | |
|---|---|---|
| JP | 08-197342 | 8/1996 |
| JP | 2002-254257 | 9/2002 |

OTHER PUBLICATIONS

EP Search Report for Corresponding Application No. EP 03257365 mailed Mar. 25, 2004.

U. Schweigert, "Vibrationsunterstuetzung Ermoeglicht Praezisionsmontage", Technische Rundschau, Hallwag Verlag. Bern, Ch, vol. 84, No. 6, Feb. 7, 1992, pp. 48-52.

Notification of Grounds for Rejection (Office Action) in corresponding Japanese Patent Application No. 338022/2002 dated Oct. 4, 2005.

* cited by examiner

ASSEMBLING METHOD AND APPARATUS

BACKGROUND OF THE INVENTION

1. Field of the Invention

The present invention relates to an assembling method and an assembling apparatus for assembling mechanical parts by use of a robot, and more particularly to a method and an apparatus for inserting a workpiece into a hole formed in an object or for fitting gear parts together while adjusting gear phase.

2. Description of Related Art

In fitting two members together for example by inserting one member held by a hand attached to a robot arm end into another, if a fitting clearance is small, a method is adopted in which a compliance mechanism is attached to the robot end so as to correct an error in position/posture for insertion of the one member to another. Also adopted is a method of performing a force control during the insertion of one member into another, without using a compliance mechanism, in which a force/moment is detected during the insertion and the robot is operated to decrease the force/moment, whereby a smooth insertion is ensured.

In either case where the compliance mechanism or the force control is used, accurate teaching must be made to enable one member held by the robot to be fitted to the other. For example, in an assembling operation of inserting a rod-like workpiece held by a robot hand into a hole formed in an object, teaching must be made such that a distal end of the workpiece is accurately positioned at the entry of the hole to which the workpiece is to be inserted, because the workpiece cannot be inserted into the hole of the object even if it is pressed toward the hole unless the workpiece is properly positioned relative to the hole, though for which a clearance may be taken into consideration. If the hole is chamfered, an allowable positioning error between the workpiece and the hole increases by an amount of chamfering, and thus the error may be determined based on the clearance and the amount of chamfering.

If the positioning within the allowable error results in failure, the workpiece cannot be inserted into the hole, and in this case, the workpiece and/or the object can be damaged if the workpiece is further pressed against the object.

For the relative positioning between the workpiece and the object, a practical assembling line requires large scaled peripheral equipment such as mechanisms for clamping the workpiece or the object, conveyor mechanisms for transporting and positioning the workpiece or the object, resulting in a high-priced assembling system. In addition, accurate position must be taught to the equipment and robot, which is disadvantageous because a burden is put on a teaching operator.

As a method for automatic positioning, it is known to make a position correction for relatively positioning the workpiece and the hole in accordance with a hole position detected by using a visual sensor or the like before insertion. A method is also known, in which a force or moment is detected to make a search-of the hole position. Still another method using a robot to insert a pin into a hole is known (referring to JP 7-314262 A) where a pin is advanced forward, and it is advanced laterally at random when a force is applied from the direction of advancement of the pin. When a moment acts on the pin, it is rotated in the direction of decreasing the moment. When receiving no reaction force, the pin is advanced straight to be fitted to the hole.

As for the automated search of the fitting position, the method of using a visual sensor entails a problem that the positioning accuracy is insufficient and the cost is high. With another conventional method where the pin is moved laterally at random when it receives a reaction force, a successful search cannot be ensured and a search time can be unduly prolonged.

SUMMARY OF THE INVENTION

The present invention provides an assembling method and an assembling apparatus capable of efficiently and easily aligning two members for their engagement and insertion, without incurring any substantial cost increase.

An assembling method of the present invention is provided for inserting a workpiece into an object at an insertion position using a robot and comprises the steps of: setting search ranges and different periods of reciprocating motions and allowable ranges within which the workpiece is insertable into the object for a plurality of search directions; and finding the insertion position by simultaneously performing the reciprocating motions of the workpiece relative to the object in the plurality of search directions while pressing the workpiece against the object in a pressing direction using the robot such that while the workpiece is moved by the set search range in the reciprocating motion of a first period in one search direction, the workpiece is moved by an amount not greater than the set allowable range in the reciprocating motion in another search direction of a second period next shortest to the first period.

When a force or a moment greater than a set value is detected in one of the search directions in performing the reciprocating motions, the reciprocating motion in the one search direction may be stopped and the reciprocating motions in the other search directions may be continued to find the insertion position. The reciprocating motion in the one search direction may be resumed when the insertion position is not found for a predetermined time period after the stoppage of the reciprocating motion.

The assembling method may further comprise a step of determining that the insertion position is found based on a change of one of a position, a motion amount and a pressing force in the pressing direction of the workpiece in the reciprocating motions. Further, the assembling method may comprise the steps of storing the found insertion position in storage means, and starting the finding step for subsequent insertion from the stored insertion position.

An assembling apparatus of the present invention comprises: search motion defining means for defining a composite search motion of simultaneous reciprocating motions of a workpiece relatively to an object at different periods in a plurality of search directions to find an insertion position; control means for controlling a motion of the workpiece held by the robot to perform the composite search motion while pressing the workpiece against the object; and detecting means for detecting finding of the insertion position.

In the assembling apparatus, the reciprocating motions of the workpiece may include a rotary reciprocating motion of the workpiece.

The assembling apparatus may further comprise means for detecting a force or a moment applied to a distal end of the robot, and the control means may control respective axes of the robot based on the detected force or moment by a force control or in accordance with kinetic equations of motion. The force control may be implemented in each of the search directions.

The search motion defining means may comprise: means for designating the plurality of search directions; means for designating the different periods of the reciprocating motions for the plurality of search directions; means for designating search ranges respectively for the plurality of search directions; means for designating amounts respectively not greater than insertable ranges between the object and the workpiece for the plurality of search directions. In this case, the search motion defining means may define a path of the composite search motion based on the search periods, the search ranges, and the amounts not greater than the insertable ranges. Further, the search motion defining means may define the path of the composite search motion such that while the workpiece is moved by the designated search range in the reciprocating motion of n-th (n: integer) shortest period in the designated direction thereof, the workpiece is moved by the amount not greater than the insertable range in the reciprocating motion of (n+1)-th shortest period in the designated direction thereof.

When a force or a moment greater than a set value is detected in one of the search directions in performing the composite search motion, the control means may stop the reciprocating motion in the one search direction and continues the reciprocating motions in the other search directions. The control means may resume the reciprocating motion in the one search direction when the insertion position is not found for a predetermined time period after the stoppage of the reciprocating motion.

The detecting means may include means for detecting that the workpiece is inserted into the object by a predetermined distance, or means for detecting that a pressing force of the workpiece against the object decreases to be less than a predetermined value.

DETAILED DESCRIPTION

The principle of a search operation of this invention will be first explained. In the case of inserting a workpiece into for example a hole in an object, the search operation starts after the workpiece is made contact with the object. In the search operation, reciprocating motions are carried out in directions other than a workpiece inserting direction. For example, when the workpiece is inserted in the Z-axis direction, the search operation is simultaneously performed in one or more directions, at the maximum five directions, in which case the search operation consists of translational motions in two X- and Y-axis directions and rotational motions in three W, P and R directions individually around X, Y and Z axes.

The following is description of an example where a rod-like workpiece 1 is inserted into a hole 3 formed in an object 2. In this example, it is assumed that the hole is chamfered by an amount r, as shown at reference numeral 4, and that there is a play (clearance) of an amount of $\epsilon$ between the workpiece 1 and the hole 3. It is further assumed that the workpiece 1 is inserted into the hole 3 in the Z-axis direction, and $\Delta L$ represents a relative positioning error (an amount of positional deviation between centers) that is observed when the workpiece 1 is in press contact with the object 2. Reference symbols 1cp and 3cp represent positions of the center axes of the workpiece 1 and the hole 3, respectively.

When the relative positioning error $\Delta L$ is "0," the workpiece 1 is inserted into the hole 3 without fail. When the workpiece 1 is within the outer circle of the chamfered portion 4 of the hole 3, it can also be inserted into the hole 3 even by means of a conventional method. Here, the maximum relative positioning deviation $\Delta L$ is defined as a deviation up to which the workpiece 1 can be positioned within the outer circle of the chamfered portion 4 of the hole 3. The radius of the outer circle of the chamfered portion 4 is larger than the workpiece radius by the sum of the chamfered amount r plus the half of the play amount $\epsilon$. Thus, even if there is a relative positioning deviation in the radial direction, the workpiece 1 can be inserted into the hole so long as such deviation is not larger than the radius difference of "$r+\epsilon/2$." Hereinafter, a range in which the workpiece can be inserted into the hole in the object will be referred to as "insertable range," and, as for the insertable range, a maximum allowable deviation in the search direction will be referred to as "insertable range amount."

In this example, the insertable range is defined as within a circle centered at the position of center and having a radius of "$r+\epsilon/2$," i.e., a diameter of "$2r+\epsilon$." For any search direction, the insertable range amount is represented by "$2r+\epsilon$" which is the diameter of the aforementioned circle. In the search operation, it is enough to move the workpiece 1 such that the center of the workpiece 1 passes through within this circle. In the aforementioned case where the rod-like workpiece 1 is inserted into the circular hole 3, the insertable range is defined by the circle centered at the center position of the hole 3 and having a diameter of "$2r+\epsilon$," and the insertable range amount in the respective search directions can be determined by measuring the chamfered amount r and the play amount $\epsilon$ of the object.

Even in a case where the workpiece/object fitting shape is different from that of the circular rod and the circular hole, the insertable range amount can be determined by object measurement, and the search operation can be made based on the determined insertable range amount.

Specifically, at first, search directions (it is assumed here that the number of them is m) are ordered in decreasing motion speed order. Hereinafter, the direction in which the fastest motion is to be made will be referred to as "reference direction." Then, search regions or ranges for respective search directions are set, so that each region has a size large enough to absorb a positional deviation between the workpiece positioned in vicinity of the insertion position and the hole or the like to which the workpiece is to be fitted. More specifically, a search range R(1) in the reference direction for the fastest motion is set, and a search range R(2) in the direction for the second fastest motion is set. Similarly, search ranges R(3), etc. are set. Then, the above-mentioned insertable range amounts for the respective directions are set, which are individually represented by. C(1), C(2), . . . in decreasing speed order, and an operation frequency f (period 1/f) in the reference direction for the fastest motion is determined.

As for the reference direction, the reciprocating motion is made in the search range R(1) at the operation frequency f (period 1/f), so that a speed command value Vd1 is determined to be equal to "2f·R(1)." While this reciprocating motion is being made in the search range R(1) in the reference direction, if the workpiece is moved in the direction for the second fastest motion in an amount equal to or less than the insertable range amount C(2), the workpiece passes without fail through the insertable range, i.e., the region in which the workpiece can be inserted into the fitting hole formed in the object. A speed command value Vd2 in the direction for the second fastest motion is determined as "2f·C(2). Similarly, the third fastest motion is made in the corresponding direction in an amount equal to or less than the insertable range amount C(3) while the second fastest motion is being made in the search range R(2) in the direction concerned. A speed command value Vd3 for the third fastest motion is equal to "2f·C(2)·C(3)/R(2)."

Similarly, the workpiece is moved in the direction for the m-th fastest motion in an amount equal to or less than the insertable range amount C(m) while it is being moved in the direction for the (m−1)-th fastest motion in the search range R(m−1). A speed command value Vm in the direction for the m-th fastest motion is represented by "2f·C(2)·C(3) . . . C(m)/R(2)·R(3) . . . R(m−1)."

By performing the search operation based on the thus determined speeds in the respective search directions, an insertable position can be detected without exception, so that the workpiece can be inserted into the hole or the like in the object.

Figure 1:
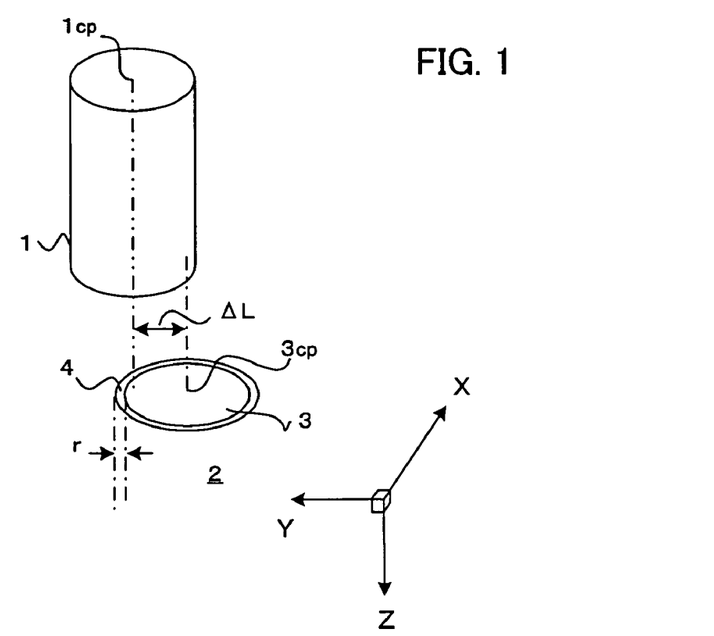
FIG. 1 is a view showing an example of operations performed in the present invention.

FIG. 1 is a view for explaining the operation of inserting the workpiece 1 into the hole 3 of the object 2 that is carried out by the assembling apparatus according to one embodiment of this invention.

The object 2 is formed with the hole 3 which extends in the Z-axis direction and into which the rod-like workpiece 1 is automatically inserted by means of a robot. The hole 3 is chamfered by a chamfering amount r. As illustrated, there is a relative positional deviation of "ΔL" between the center positions 1cp, 3cp of the workpiece 1 and the hole 3.

In this case, the search operation is made in the X- and Y-axis directions. The chamfering amount r and the play amount ε between the workpiece 1 and the hole 3 are measured, and the insertable range amounts C(X), C(Y) in the X- and Y-axis directions are determined. In this example, the play amount ε is set to "0," and the insertable range amounts C(X), C(Y) are determined to be equal to "2r." Then, the search ranges R(X), R(Y) in the X- and Y-axis directions are determined. Here, it is assumed that R(X) is set to a range from XL to XU, and R(Y) is set to a range from YL to YU.

Then, the X-axis direction is set as the reference direction for the fastest motion, and the reciprocating frequency f (period 1/f) is set, so that a speed command Vdx in the X-axis direction is equal to "2f·R(X)." If a Y-axis direction motion is made for a distance smaller than the insertable range amount C(Y) during a time (1/2f) in which an X-axis direction motion is made for a distance of R(X), the center position 1cp of the workpiece 1 falls, in the course of the search operation, within the insertable range 10 that is defined by a circle centered at the center position 3cp of the hole 3 of the object 2 and having a radius corresponding to the chamfering amount r. A speed command Vdy in the Y-axis direction is represented by: Vdy=2f·C(Y)=2f·2r=4fr.

Figure 2:
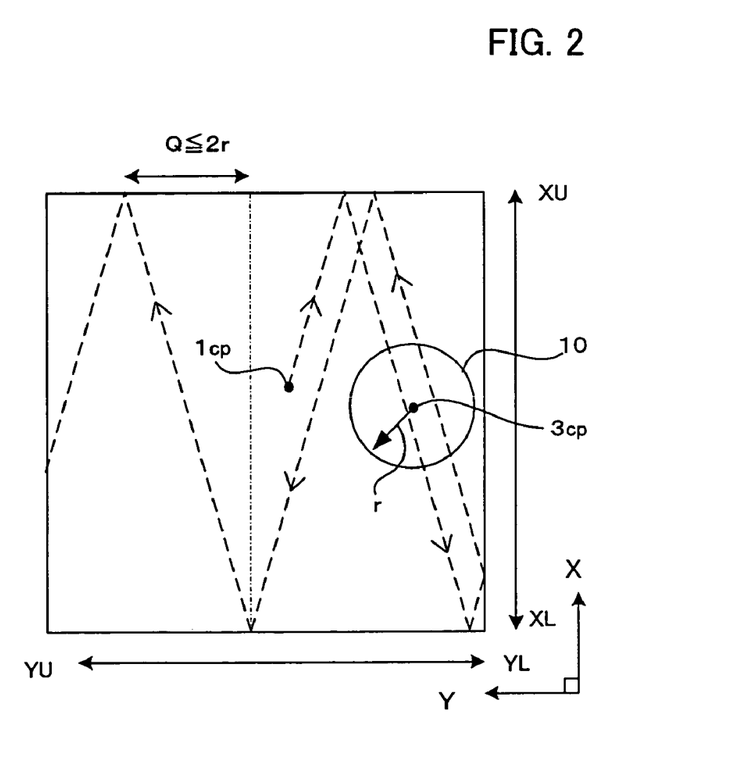
FIG. 2 is a view for explaining a search operation in the example implemented by the present invention and an embodiment thereof.

FIG. 2 is a view for explaining the aforementioned search operation, in which a dotted line indicates a path along which the center 1cp of the workpiece 1 is moved in the search, symbol 3cp denotes the center of the hole, and reference numeral 10 indicates the insertable range defined by a circle having a radius of r. While an X-axis direction motion is being made in the search range R(X) varying from XL to XU, a Y-axis motion is made by an amount of Q that is equal to or smaller than 2r. As a result, while the search is being made in the X- and Y-axis direction search ranges R(X), R(Y) varying from XL to XU and from YL to YU, respectively, the center of the workpiece 1 inevitably falls within the insertable range 10 defined by the circle centered at the center of the hole 3 and having the radius of r. Since the workpiece 1 is pressed toward the object 2, i.e., in the Z-axis direction, the workpiece 1 is inserted into the hole 3 when its center falls within the circle 10, i.e., the insertable range, centered at the center position 3cp of the hole 3 and having the radius r.

Figure 3:
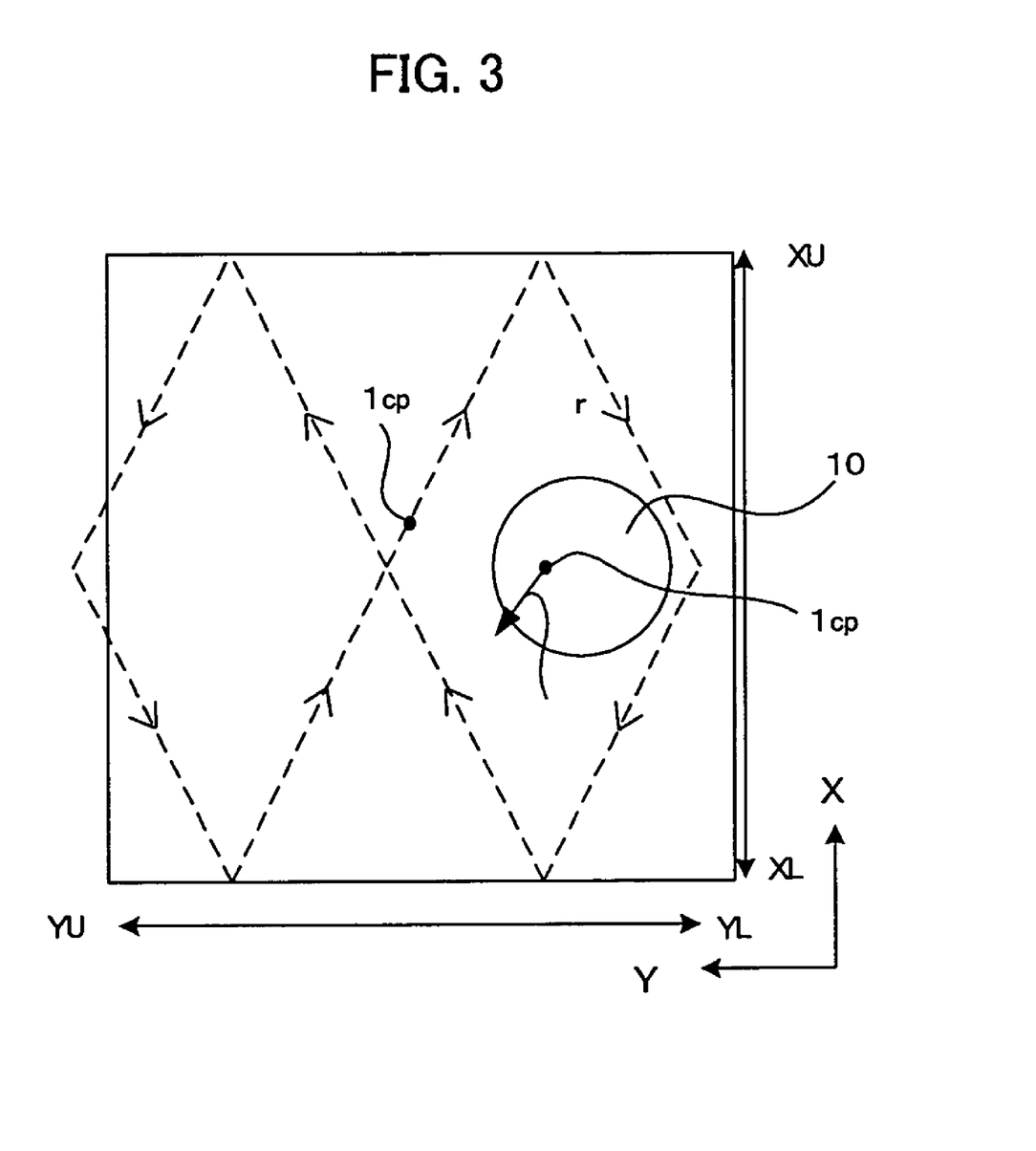
FIG. 3 is a view for explaining a case where a search operation in the example results in failure.

FIG. 3 shows an example where the Y-axis direction speed is made faster than "4fr," so that the Y-axis direction motion may be made for a distance greater than 2r while the X-axis direction motion is made in the search range R(X) varying from XL to XU. In this case, as shown in FIG. 3, the center of the workpiece 1 falls outside the circle centered at the center of the hole 3 and having the radius of r, i.e., the insertable range 10, even if the search is made in the preset search range (i.e., in the X- and Y-axis direction search ranges R(X), R(Y) varying from XL to XU and from YL to YU).

Figure 4:
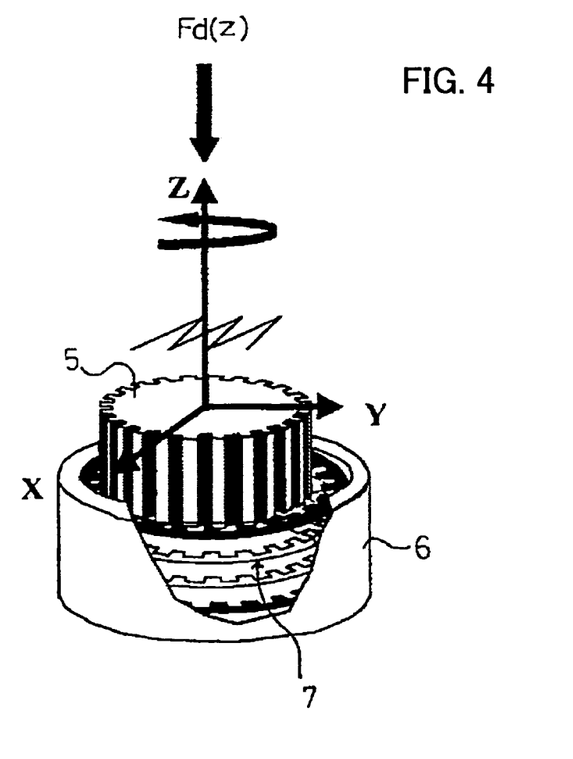
FIG. 4 is a view showing another example of operations performed in this invention.

FIG. 4 is a view for explaining a second example in which a clutch for use in an automatic transmission is assembled by means of the assembling apparatus according to the embodiment. More specifically, an operation of inserting a gear 5 formed with outer teeth into ring plates 7 each formed with inner teeth is automatically implemented, while these teeth are made in phase with one another. Reference numeral 6 denotes an outer cylinder for accommodating the plates 7. In this example, it is assumed that the gear 5 is inserted into the plates 7 in the Z-axis direction. The plates 7 are moved in the X- and Y-axis directions and rotatable (in an R-direction) around the Z-axis.

Figure 5:
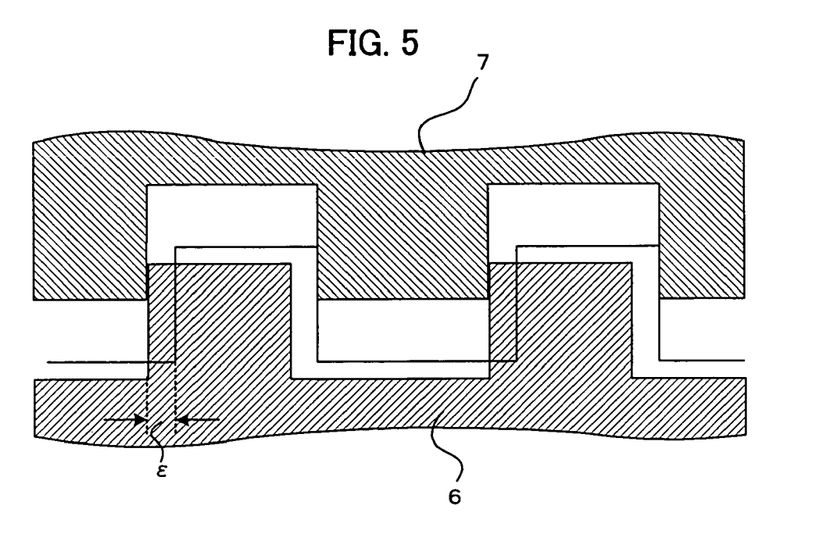
FIG. 5 is a view for explaining an insertable range amount in R direction in another example.

In this example, there are three search directions, i.e., X-axis direction, Y-axis direction, and R direction. Search ranges R(X), R(Y) and R(R) for the search directions are determined and set such that the center of the plates 7 is present in each of the ranges R(X), R(Y) and R(R). In the example, no chamfering is provided, and thus the insertable range amounts C(X), C(Y) in the X- and Y-axis directions individually correspond to play amounts between the plates 7 and the gear 5 in the X- and Y-axis directions. The insertable range amount C(R) in the R direction is equivalent to a play amount corresponding to the backlash of the gear. FIG. 5 is a view for explaining the insertable range amount C(R) in the R direction. There is a play distance ε between the gear 5 and the plate 7 in the R direction (around the Z-axis), which corresponds to the insertable range amount C(R).

In this example, the R direction is set as the direction for the fastest motion, and the frequency of this reciprocating rotary motion is set at f. Further, the X- and Y-axis directions are set as the directions for the second and third fastest motions, respectively.

A speed command VdR in the R direction is represented as: VdR=2f·R(R).

The X-axis direction motion is made by the insertable range amount C(X) during the time (1/2f) in which the R direction motion is made in the search range R(R). A speed command dx in the X-axis direction is represented as: dx=2f·C(X).

During the time of (R(X)/2f·C(X)) in which the X-axis direction motion is made in the search range R(X), the Y-axis direction motion is made by the insertable range amount C(Y). A speed command Vdy in the Y-axis direction is represented as: Vdy=2f·C(X)·C(Y)/R(X).

These speed commands for the respective directions are output to drive the robot, whereby the workpiece 1 or the gear 5 is moved to attempt to insert the same into the hole 3 or the plate 7. In the course of the search, when a force or moment in a certain direction increases, it can be considered that these two fitting parts are made consistent in position or angle with each other so that their engagement may be achieved as far as in that direction. Thus, the motion in that direction is temporally stopped, whereas the search in the other directions is continued. If the insertion of the workpiece or the like into the hole or the like is not detected during the temporal stoppage for a predetermined time period, the temporal stoppage is released and the search in the direction concerned is started again. The search operation is finished, if the insertion of the workpiece or the like into the hole or the like is detected in the course of the search in terms of force, motion amount, moved position, or the like.

Figure 6:
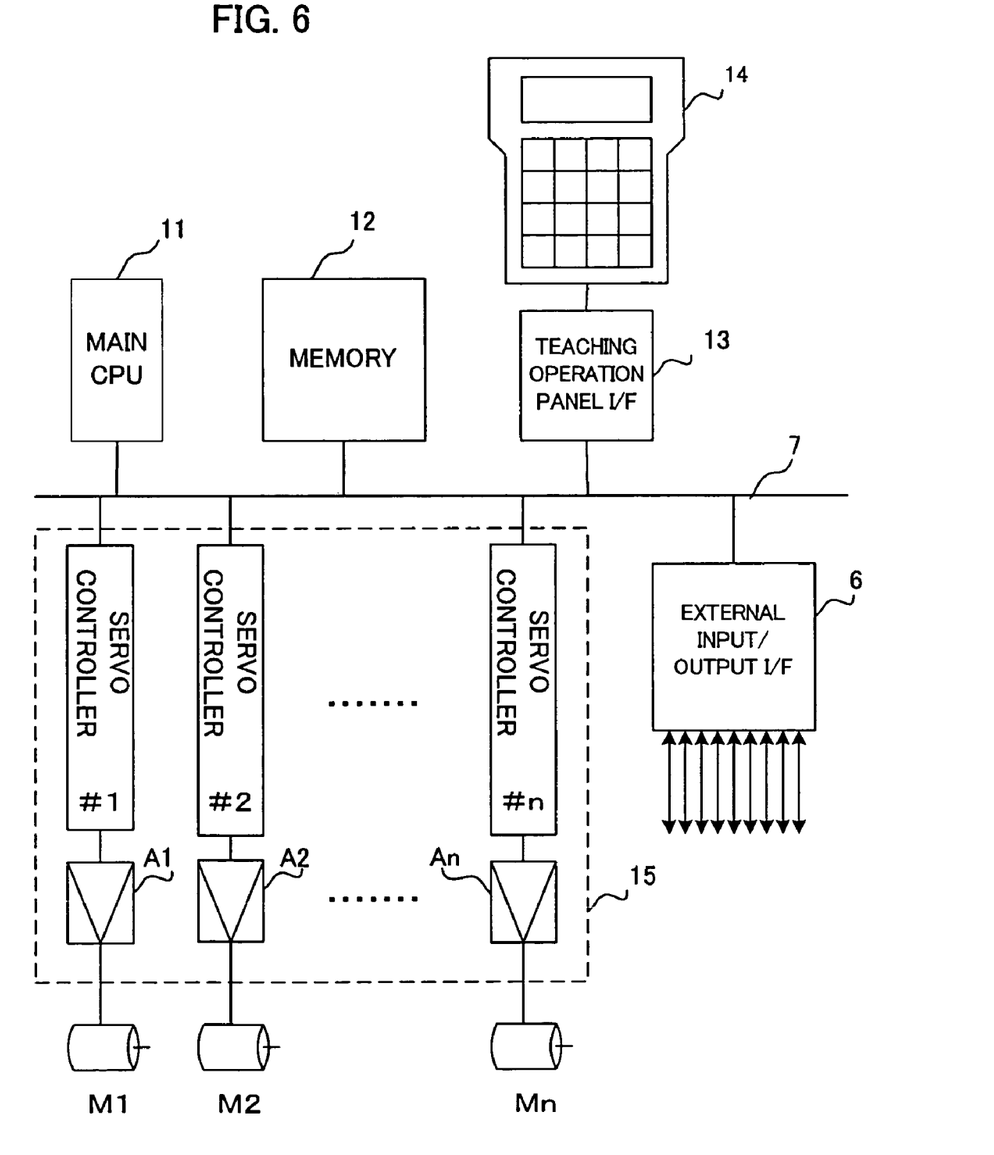
FIG. 6 is a view showing an essential part of a robot control apparatus of a robot which forms an assembling apparatus according to one embodiment of this invention.

FIG. 6 is a block diagram showing an essential part of a robot control apparatus serving as one embodiment of the assembling apparatus of this invention, which is the same in construction as a conventional one. Reference numeral 17 denotes a bus to which connected are a main processor 11, a memory 12 comprised of a RAM, ROM, non-volatile memory (such as EEPROM), etc., an interface 13 for a teaching operation panel, an interface 16 for external equipment, and a servo control unit 15. A teaching operation panel 14 is connected to the interface 13 for it, and the setting of various preset values and parameters is made with use of the teaching operation panel 14, through which, in this embodiment, the reference direction (reference axis), search directions (search axes), insertable range amounts, pressing direction, pressing force, pressing speed, search frequency or search period, etc. are input and set.

A system program for performing basic functions of the robot control apparatus and the robot is stored in the ROM of the memory 12. A program for the search operation of this invention and relevant preset data are set through the teaching operation panel 14, etc., and stored in the non-volatile memory of the memory 12. The RAM of the memory 12 serves as a memory region used for temporal data storage during various arithmetic processing performed by the processor 11.

The servo control unit 15 comprises servo controllers #1 to #n (where n indicates the total number of robot axes, or the sum of this number plus the number of movable axes of a tool attached, where required, to the wrist of the robot). Each of the servo controllers #1–#n is constituted by a processor, ROM, RAM, etc., and arranged to carry out a position/speed loop control and a current loop control for a corresponding axis-servomotor. In other words, each controller is comprised of a so-called digital servo controller for implementing software-based loop controls of position, speed, and current. Outputs of the servo controllers #1–#n are delivered through servo amplifiers A1–An to axis-servomotors M1–Mn, whereby these servomotors are drivingly controlled. Although not shown, the servomotors M1–Mn are provided with position/speed detectors for individually detecting the positions/speeds of the servomotors, so that the positions/speeds of the servomotors are fed back to the servo controllers #1–#n. Further, a six-axis sensor provided in the robot as well as actuators and sensors of peripheral equipment are connected to the input/output interface 16.

The aforementioned construction of the robot control apparatus is the same as that of a conventional one. The assembling apparatus of this invention is constituted by the robot and robot control apparatus.

Figure 7:
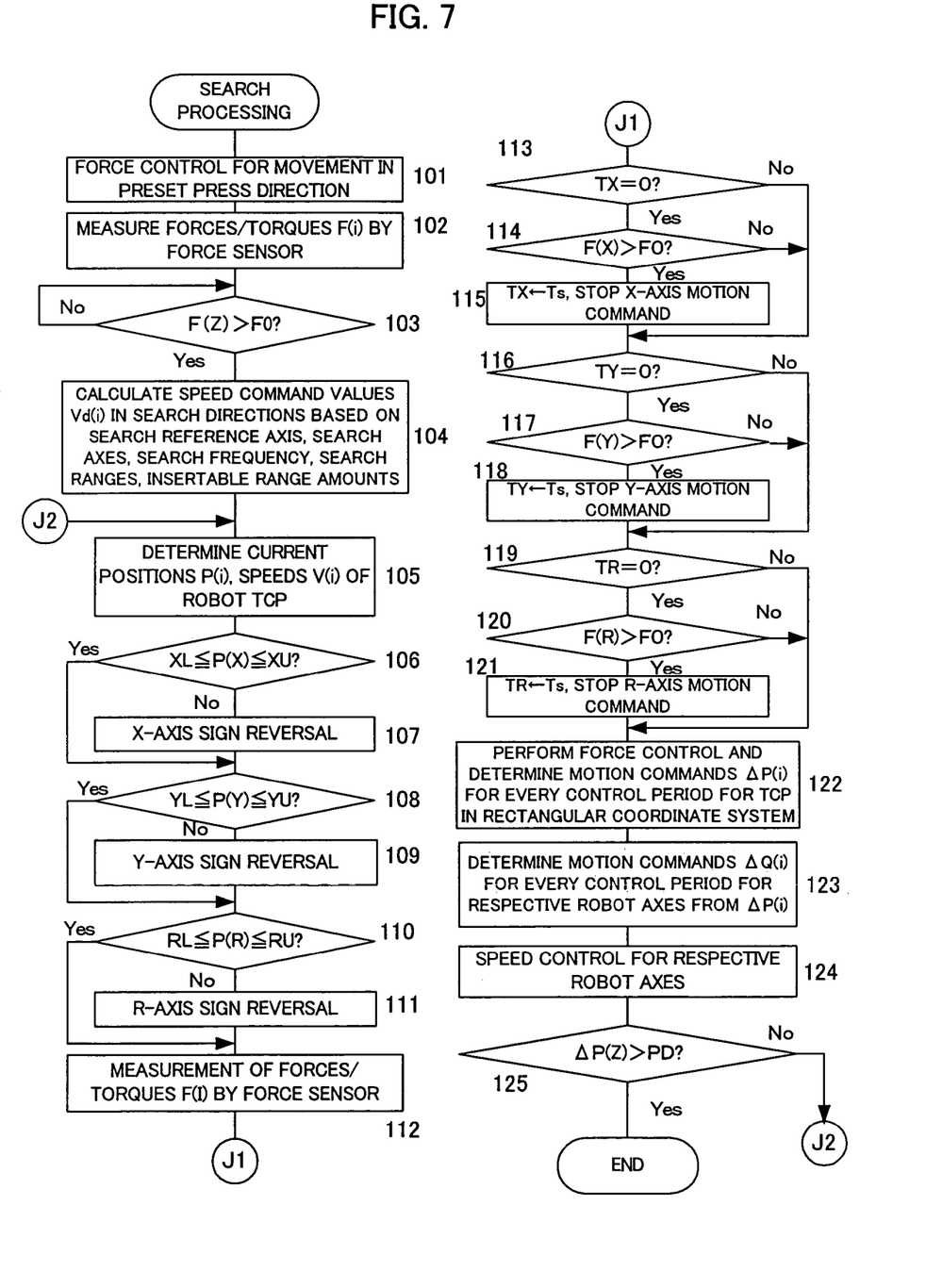
FIG. 7 is a flowchart of processing for search, insertion, and assembly that is performed based on speed commands in the embodiment.

FIG. 7 is a flowchart of processing of a search operation in this embodiment, which is executed for an operation of inserting the gear 5 into the plates 7 shown in FIG. 4.

At first, the robot which holds the gear 5 is driven in accordance with a teaching program or the like, thus moving the gear 5 to a position which is taught in advance and at which the insertion of the gear to the hole of the plates 7 is started. Then, the processing of search and fitting shown in FIG. 7 is started.

By means of a force control which is the same as a conventional one, the gear 5 is moved in a predetermined pressing direction (here, the Z-axis direction) (Step 101). Specifically, for this motion, a force control for the respective axes is performed based on force command values Fd(i) and speed command values Vd(i) (where i indicates X, Y, Z, W, P, and R axes, wherein the W, P and R axes are taken in the directions around the X, Y and Z axes, respectively). Here, only the force command value Fd(Z) in the Z-axis direction is set, and the force command values for the other axes are at 0. Similarly, only the speed command value Vd(Z) in the Z-axis direction is set, and the speed command values for the other axes are at 0.

Next, forces/torques F(i) applied to the robot wrist are detected by the six-axis sensor provided at a distal end of the wrist (Step 102).

Then, a pressing operation is performed until a detected force/torque F(i) in the insertion direction exceeds a preset value F0 (Step 103). In this example where the insertion is made in the Z-axis direction, the Z-axis direction motion is continued until it is determined that the detected force/torque F(Z) in the Z-axis direction exceeds the preset value F0.

If it is detected that the preset value F0 is exceeded so that the workpiece (gear 5) is pressed against the object (plates 7) with a predetermined pressing force, speed commands Vd(i) for the respective axes are determined based on the search reference axis (in the example shown in FIG. 4, the R axis taken around the Z axis) extending along the reference direction, the search axes (X and Y axes), the search frequency f, the search ranges R(X), R(Y), R(R), and the insertable range amounts C(X), C(Y), C(R), which are set in advance (Step 104).

As described above, there are the following relations:

$$Vd(R)=2f \cdot R(R),$$

$$Vd(X)=2f \cdot C(X), \text{ and}$$

$$Vd(Y)=2f \cdot C(X) \cdot C(Y)/R(X),$$

where these speed commands Vd(i) for the axes concerned are initially instructed to act in positive directions.

Next, the current positions P(i) and speeds V(i) of the tool center point (TCP) of the robot are determined (Step 105).

As for the current positions P(X), P(Y), P(R) in the X-, Y- and Z-axis search directions, among the determined current positions, a determination is made as to whether they fall within the search ranges R(X), R(Y), R(R) varying from XL to XU, from YL to YU, and from RL to RU, respectively. Specifically, a determination is made as to whether the current X-axis direction position P(X) increases beyond the upper limit value XU or decreases beyond the lower limit value XL of the search range. This applies to the other Y and R axes. If either one of the current positions falls outside the search range, the sign of the corresponding command Vd(i) is reversed (Steps 106–111).

Next, forces/torques F(i) for the respective axes are detected by the force sensor (where i denotes X, Y, Z, W, P, or Z axis) (Step 112), and whether each of timers TX, TY, TR is at a value of 0 is determined (Steps 113, 116 and 119). Each timer measures a time period for which the motion in the search direction concerned is to be temporally stopped. If any of the timers is at 0, a determination is made as to whether a corresponding one of the forces/torques F(X), F(Y), F(R) in the X, Y and R directions detected at Step 112 exceeds the preset reference value F0 (Steps 114, 117 and 120).

If any of the forces/torques F(X), F(Y), F(R) exceeds the preset reference value F0, it can be considered that a positional deviation between the gear 5 (workpiece 1) and the plates 7 (the hole 3 of the object 2) is within the insertable range for the direction concerned. Thus, a motion command for that direction is stopped from being delivered, and a stop time Ts is set to a corresponding one of the timers TX, TY, TR which is then started (Steps 115, 118 and 121).

Next, a force control is carried out based on a known force control method, in which motion commands ΔP(i) for every control period for the robot TCP in a rectangular coordinate system are determined (Step 122). For instance, in case that a known impedance control is performed for the force control, the motion commands ΔP(i) for the robot TCP in the rectangular coordinate system for every control period are determined on the basis of the speed command values Vd(i) determined at Step 104, the actual speeds V(i) determined at Step 105, force command values Fd(i) set in advance, and the forces/torques F(i) determined at Step 112. At this time, sign reversal is made for the axis for which the sign of the speed command Vd(i) is reversed at Step 107, 109 or 111. As for the axis for which the delivery of motion command is stopped and the timer has not been decreased to 0 as yet, the motion command ΔP(i) is not delivered.

From the determined motion commands ΔP(i) for every control period in the rectangular coordinate system, motion commands ΔQ(i) (rotational angles) for the respective articulated axes of the robot for every control period are determined (Step 123). These motion commands for the respective axes are output to the servo controllers #1–#n for the respective articulated axes, and in accordance with the motion commands, a speed control for these axes is implemented to drivingly control the robot (Step 124). The force command value Fd(Z) in the Z-axis direction, i.e., in the inserting direction, is set at a predetermined value. Thus, whether a move amount ΔP(Z) in the Z-axis direction for insertion is equal to or larger than a preset value PD is determined, and if not so, the flow returns to Step 105 and the foregoing processing is repeatedly carried out. In stead of detecting the insertion completion based on the move amount ΔP(Z) in the Z-axis direction, the completion of insertion may be detected when the Z-axis direction position exceeds a predetermined value, or when the detected force/torque F(Z) decreases to be equal to or less than a preset value Fs.

Subsequently, the processing of Step 105 to Step 125 is repeatedly carried out. When the search range for any of the search directions is exceeded, the sign reversal is made for that direction (Steps 106–111). When the force/torque exceeding the preset value F0 is detected for any search direction, the motion command for that direction is stopped from being output for a predetermined time period Ts that is set in the timer associated therewith, and if the search has not been finished even when the predetermined time period has elapsed so that the timer value decreases to zero, the temporal stoppage is released, and the search which is the same as the original one is started again and continued (Steps 113–121).

While the search is continued, if the gear 5 (workpiece 1), which is kept pressed in the insertion direction, falls within the insertable range 10, it starts to be inserted into the plates 7 (the hole 3 of the object 2), resulting in increase in move amount in the Z-axis direction, i.e., the insertion direction. When the move amount ΔP(Z) exceeds the preset value PD, the processing of search and inserting assembly is finished, considering that the gear 5 (the workpiece 1) has been inserted into the plates 7 (the hole 3 of the object 2).

In the above embodiment, a speed-command-based control for inserting the workpiece into the hole of the object or the like has been described by way of example. Alternatively, a torque-command-based insertion control may be performed. Processing based on a torque command is shown in FIG. 8.

Figure 8:
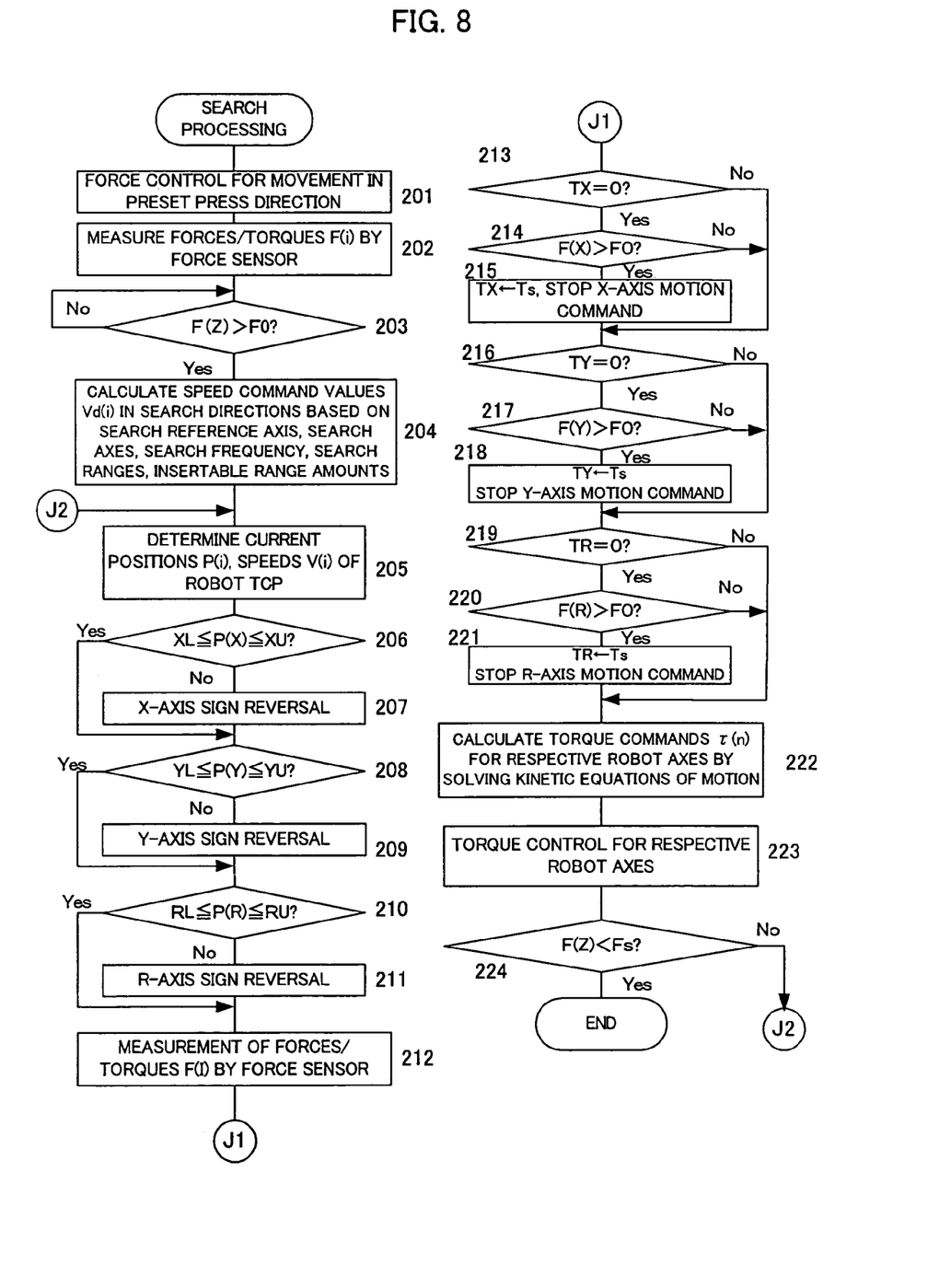
FIG. 8 is a flowchart of processing for search, insertion, and assembly that is performed based on torque commands in the embodiment.

The processing of FIG. 8 differs from the one shown in FIG. 7 only in that it comprises Steps 222–224. The processing of Steps 201–221 shown in FIG. 8 is the same as that of Steps 101–121 of FIG. 7, and hence explanations of Steps S201–221 are omitted.

At Step 222, in accordance with known kinetic equations of motion based on a Newton-Euler method, a Lagrangian method, or the like, torque commands T(n) for the respective articulated axes of the robot are determined from speed commands Vd(i), actual speeds V(i), and detected forces/torques F(i). On the basis of the determined torque commands τ(n), a torque loop control is performed by means of the servo controllers #1–#n, to drivingly control the respective axis servomotors M1–M6 (Step 223). Then, whether the detected force/torque F(Z) in the insertion direction (the Z-axis direction) has decreased to be less than a preset value Fs is determined (Step 224), and if not so, the flow returns to Step 205, whereupon the processing of Steps 205–224 is repeatedly carried out.

Since the gear 5 (the workpiece 1) is pressed against the plates 7 (the hole 3 of the object 2), the detected force/torque F(Z) does not decrease unless the gear is fitted into the insertion hole. On the other hand, when the gear 5 (the workpiece 1) is inserted into the plates 7 (the hole 3 of the object 2), a reaction force is no longer applied to the robot, so that the detected force/torque F(Z) decreases to be equal to or less than the preset value Fs, whereby the insertion can be detected. When the insertion is detected, the processing of search and inserting assemblage is completed. Alternatively, the insertion may be determined when the move amount ΔP(Z) in the Z-axis direction has increased to be equal to or greater than the preset value PD.

As described above, the search is performed to find the position at which the workpiece held by the robot can be inserted into the object. For successful search, the search range must be made larger than a positioning error, although the search time and assembly time are of course prolonged with the increasing search range.

If the positioning accuracy is improved, the search time can be shortened to make it possible to detect the insertion position within a short time period. However, this increases load on a teaching operator and prolongs a teaching time. From the viewpoint of the efficiency and ease of position teaching, therefore, it is convenient to let a low positioning accuracy as it is.

Thus, in the case of successively implementing a robot operation of automatically inserting a workpiece into an object that is positioned with some accuracy, an insertion start position is first determined with accuracy that can easily be realized by an operator, and search ranges that are sufficiently wider than the positioning accuracy are set. A search operation is carried out under these conditions, and a position is stored that is observed when an insertion position is detected during the search. In the next and subsequent searches, the search time can be shortened by starting the search from the stored position.

In a positioning system comprised of the robot and an apparatus for positioning the object, if the positioning accuracy is smaller than the aforesaid chamfering amount r, the search range is zero, so that the search can be omitted. If the accuracy of the positioning system is larger than the chamfering amount r, the search is made for the search range determined by adding a value of $\alpha$ to the accuracy of the positioning system.

Figure 9:
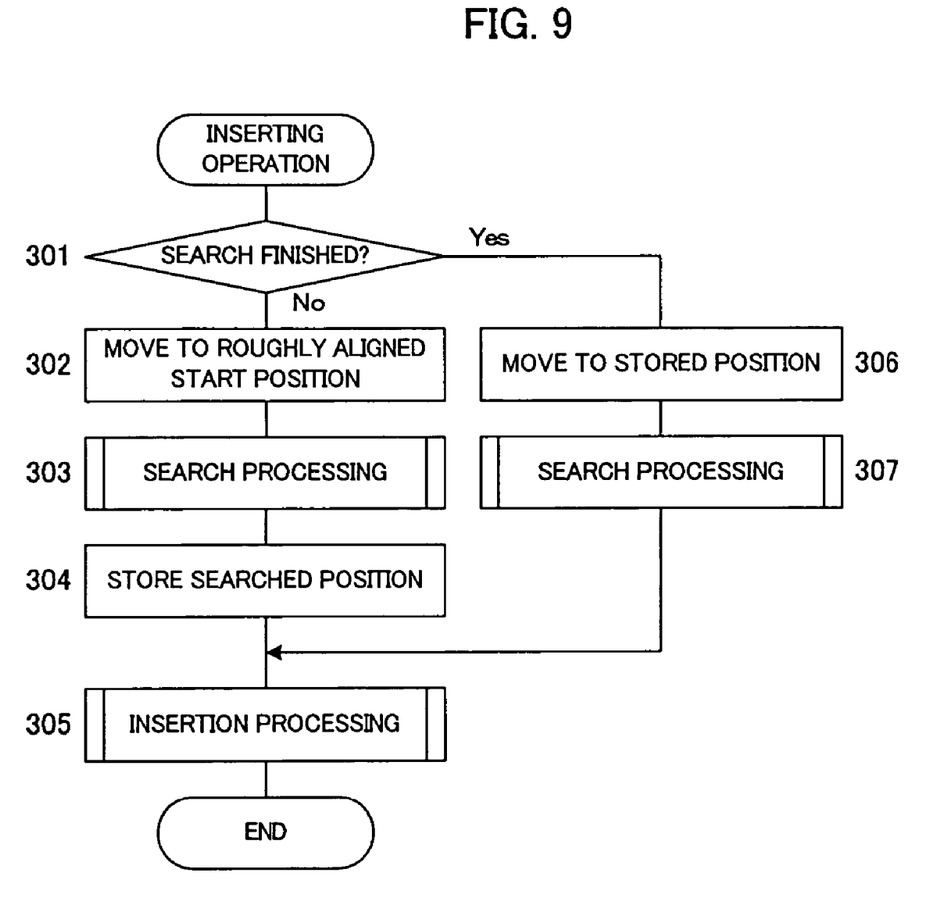
FIG. 9 is a flowchart of an assembling method according to an embodiment of this invention.

FIG. 9 is a flowchart of an assembling method for inserting, by means of a robot, a workpiece into each of objects supplied in sequence to a predetermined position. In this example, the system is designed to insert, as shown in FIG. 1, the workpiece 1 into the hole 3 formed in the object 2, and the positioning accuracy of the system is less than the chamfering amount r.

A determination is made by an operator as to whether the insertion start position has been searched (Step 301), and if not so, a rough alignment to the insertion start position is performed (Step 302). Then, the operator causes the robot to implement the search operation shown in FIG. 7 or 8 (Step 303). If the insertion position is detected, the detected position is stored in the memory 12 (Step 304). Then, the workpiece 1 is inserted into the hole 3 in the object 2 (Step 305), whereupon the insertion and assemblage operation is finished. In the operation of inserting the workpiece 1 into each of the next and subsequent objects 2, the robot is operated to move the insertion position having been searched and stored (Step 306), and the search is implemented from that position (Step 307). This search start position is the insertion position which has been determined by the search for the previous object and workpiece, and is in vicinity of the present insertion position. Specifically, the search start position is within an error range that varies depending on the positioning error of the apparatus for positioning the object, an error in holding the workpiece by the robot hand, etc. Thus, in the search at Step 307, the insertion position can be detected within a short time period. When the insertion position is detected, the flow advances to Step 305 where the workpiece 1 is inserted into the hole 3 in the object 2, and then the assembling operation is finished. Subsequently, the processing of Steps 301, 306, 307 and 305 is repeatedly carried out.

This invention can reliably and easily detect the inserting and fitting position and can automatically carry out the inserting and fitting operation. As compared to the prior art, this invention does not require special equipment and does not result in cost increase.

What is claimed is:

1. An assembling method for inserting a workpiece into an object at an insertion position using a robot, comprising the steps of:
    setting search ranges and different periods of reciprocating motions and allowable ranges within which the workpiece is insertable into the object for a plurality of search directions; and
    finding the insertion position by simultaneously performing the reciprocating motions of the workpiece relative to the object in the plurality of search directions while pressing the workpiece against the object in a pressing direction using the robot such that while the workpiece is moved by the set search range in the reciprocating motion of a first period in one search direction, the workpiece is moved by an amount not greater than the set allowable range in the reciprocating motion in another search direction of a second period next shortest to the first period.

2. An assembling method according to claim 1, wherein when a force or a moment greater than a set value is detected in one of the search directions in performing the reciprocating motions, the reciprocating motion in the one search direction is stopped and the reciprocating motions in the other search directions are continued to find the insertion position.

3. An assembling method according to claim 2, wherein the reciprocating motion in the one search direction is resumed when the insertion position is not found for a predetermined time period after the stoppage of the reciprocating motion.

4. An assembling method according to claim 1, further comprising a step of determining that the insertion position is found based on a change of one of a position, a motion amount and a pressing force in the pressing direction of the workpiece in the reciprocating motions.

5. An assembling method according to claim 1, further comprising the steps of storing the found insertion position in storage means, and starting the finding step for subsequent insertion from the stored insertion position.

6. An assembling apparatus for inserting a workpiece into an object at an inserting position using a robot, comprising:
    search motion defining means for defining a composite search motion of simultaneous reciprocating motions of the workpiece relatively to the object at different periods in a plurality of search directions to find the insertion position;
    control means for controlling a motion of the workpiece held by the robot to perform the composite search motion while pressing the workpiece against the object; and
    detecting means for detecting finding of the insertion position.

7. An assembling apparatus according to claim 6, wherein the reciprocating motions of the workpiece include a rotary reciprocating motion of the workpiece.

8. An assembling apparatus according to claim 6, further comprising means for detecting a force or a moment applied to a distal end of the robot, wherein said control means controls respective axes of the robot based on the detected force or moment by a force control or in accordance with kinetic equations of motion.

9. An assembling apparatus according to claim 8, wherein the force control is implemented in each of the search directions.

10. An assembling apparatus according to claim 6, wherein said search motion defining means comprises: means for designating the plurality of search directions; means for designating the different periods of the reciprocating motions for the plurality of search directions; means for designating search ranges respectively for the plurality of search directions; means for designating amounts respectively not greater than insertable ranges between the object and the workpiece for the plurality of search directions.

11. An assembling apparatus according to claim 10, wherein said search motion defining means defines a path of the composite search motion based on the search periods, the search ranges, and the amounts not greater than the insertable ranges.

12. An assembling apparatus according to claim 11, wherein said search motion defining means defines the path of the composite search motion such that while the workpiece is moved by the designated search range in the reciprocating motion of n-th (n: integer) shortest period in the designated direction thereof, the workpiece is moved by the amount not greater than the insertable range in the reciprocating motion of (n+1)-th shortest period in the designated direction thereof.

13. An assembling apparatus according to claim 6, wherein when a force or a moment greater than a set value is detected in one of the search directions in performing the composite search motion, said control means stops the reciprocating motion in the one search direction and continues the reciprocating motions in the other search directions.

14. An assembling apparatus according to claim 13, wherein said control means resumes the reciprocating motion in the one search direction when the insertion position is not found for a predetermined time period after the stoppage of the reciprocating motion.

15. An assembling apparatus according to claim 6, wherein said detecting means includes means for detecting that the workpiece is inserted into the object by a predetermined distance.

16. An assembling apparatus according to claim 6, wherein said detecting means includes means for detecting that a pressing force of the workpiece against the object decreases to be less than a predetermined value.

* * * * *